J. W. BRUCE.
WHEEL.
APPLICATION FILED OCT. 13, 1915.

1,190,101.

Patented July 4, 1916.
2 SHEETS—SHEET 1.

Witness
Frederick W. Ely

Inventor
J. W. Bruce.
By Victor J. Evans
Attorney

J. W. BRUCE.
WHEEL.
APPLICATION FILED OCT. 13, 1915.
1,190,101.
Patented July 4, 1916.
2 SHEETS—SHEET 2.
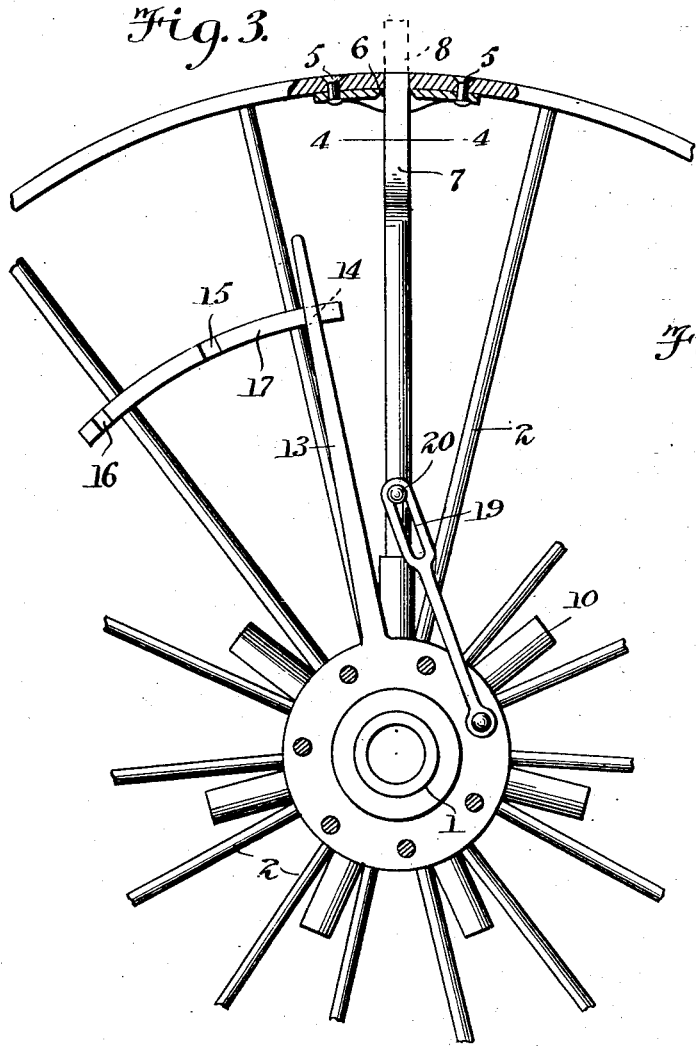
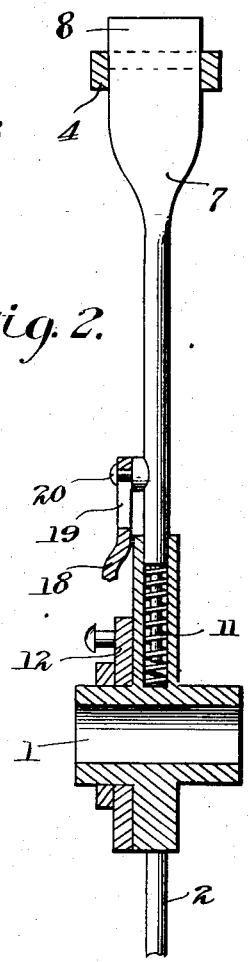
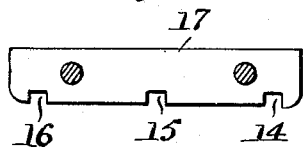
Inventor
J. W. Bruce.
Witness
Frederick W. Ely
By Victor J. Evans
Attorney

UNITED STATES PATENT OFFICE.

JAMES WESLEY BRUCE, OF SUMMERFIELD, OHIO.

WHEEL.

1,190,101.       Specification of Letters Patent.       Patented July 4, 1916.

Application filed October 13, 1915. Serial No. 55,701.

*To all whom it may concern:*

Be it known that I, JAMES W. BRUCE, a citizen of the United States, residing at Summerfield, in the county of Noble and State of Ohio, have invented new and useful Improvements in Wheels, of which the following is a specification.

This invention relates to traction wheels, and one of its objects is to provide a traction wheel having grippers adapted to be projected beyond the wheel rim for gripping engagement with the ground, or to be withdrawn within the rim to prevent mutilation of roads or streets when the use of the gripping means is not required.

A further object of the invention is to provide grippers which may be disposed in projected position to a greater or less degree in such manner as to permit them to yield when the wheel runs over a smooth surface and to remain projected for gripping engagement when the wheel runs over an irregular surface, thus varying the gripping power of the wheel as occasion requires.

The invention consists of the features of construction, combination and arrangement of parts herein fully described and claimed, reference being had to the accompanying drawings in which:—

Figure 1:
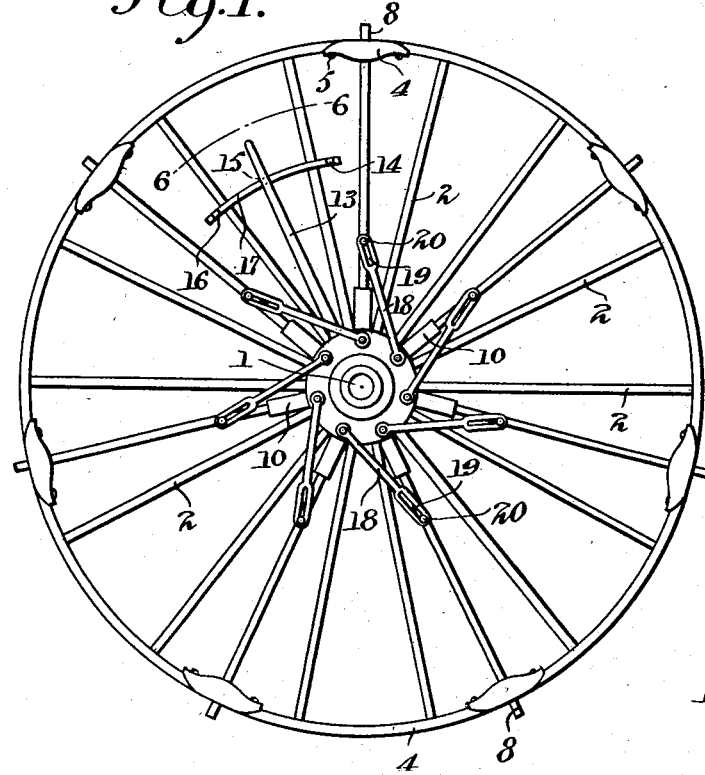
Figure 7:
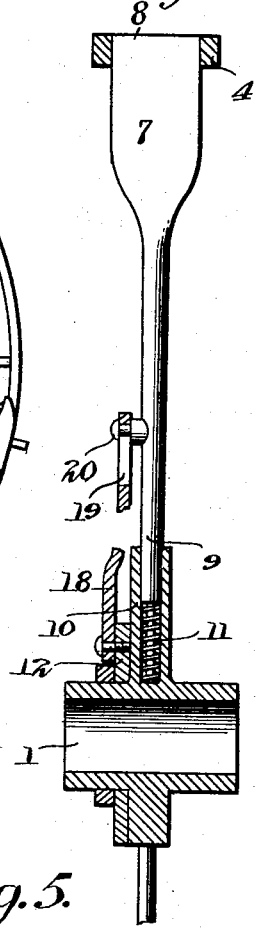
Figure 4:
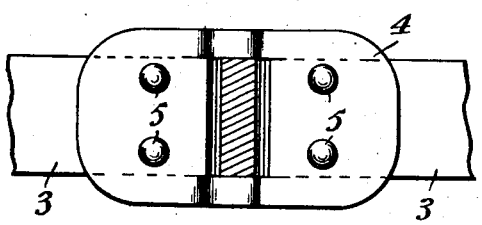
Figure 5:
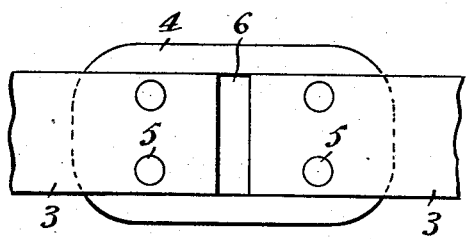

Figure 1 is a side elevation of a wheel embodying my invention. Fig. 2 is a vertical transverse section through the wheel, showing one of the grippers in projected position. Fig. 3 is a side elevation of a portion of the wheel on an enlarged scale and showing the gripper locking means. Fig. 4 is a detail section on the line 4—4 of Fig. 3 looking toward the adjacent side of the wheel rim. Fig. 5 is a view in elevation looking toward the outer side of the wheel rim and showing one of the coupling members. Fig. 6 is a detail section on the line 6—6 of Fig. 1. Fig. 7 is a view similar to Fig. 2 showing the gripper retracted.

Referring to the drawings, 1 designates the hub, 2 the fixed spokes and 3 the rim or felly of the wheel, which rim is preferably constructed of a series of segmental sections united at their adjacent ends by coupling members 4. These coupling members are secured to the rim sections by fastenings 5 and hold the adjacent ends of the rim sections spaced to provide guide passages or openings 6.

Arranged preferably in alternation with the fixed spokes 2 are radially movable auxiliary spokes or gripping members 7 having outer end portions 8 freely movable in the passages 6 and having reduced inner end portions 9 which telescopically engage or slidably fit within guide sockets 10 provided within or upon the hub 1. A coiled spring 11, arranged within each socket, exerts its expansive force to move the spokes 7 outward radially, so as to project the end 8 beyond the face of the rim 3 for a gripping action upon the surface of the ground.

For the purpose of controlling the radially movable grippers or auxiliary spokes 7 I provide a rotary collar or sleeve 12 which is suitably secured in position upon the hub 1 and is provided with a lever arm 13 whereby it may be rotated, the outer free end of said lever arm serving as a detent to engage any one of a series of keeper notches 14, 15 and 16 in a segmental locking plate or keeper member 17 secured to the rim or fixed spokes of the wheel. Pivoted to the collar or sleeve is a series of controlling links 18, one for each movable gripper, which links are provided at their outer ends with elongated longitudinal slots 19 receiving a pin or projection 20 upon the adjacent gripper 7, the pivotal connections between the collar or sleeve and the links being set eccentrically so as to permit said links to be slidably adjusted longitudinally of the grippers 7 and within certain limits prescribed by the length of the slots 19.

The parts are so constructed and arranged that when the lever arm is engaged with the gripper notch 14 the outer end walls of the slots 19 will engage the pins 20 of the movable grippers and hold said grippers drawn inwardly so as to lie flush with the surface of the rim 3, thereby providing a substantially smooth-surfaced rim for travel over good roads or streets, where running is easy. By moving the lever to its second position in which it engages the keeper notch 15, the link bars 18 will be moved outwardly to approximately one-half their extent of adjustment, thus permitting the springs 11 to project the grippers 7 to a certain degree. When the grippers are so projected they are adapted when the adjacent portion of the rim strikes a smooth surface to recede to a position flush with the rim, as such motion is permitted by the spring and link, but when such portion of the wheel comes into alinement with a rut or depression the gripper will remain projected and bind at an angle against a wall of the guide passage, so that it will perform the function of a gripping spur or cleat to give greater tractive power in the travel of the wheel over more or less irregular surfaces. When the lever is adjusted to its third position in engagement with the keeper notch or recess 16, it will be evident that the links 18 will be moved outwardly to their fullest extent, and will thereby allow projection of the grippers 7 to their fullest extent. In this position of the links the grippers will be held from receding and will therefore form non-receding gripping projections for engagement with rough roads or surfaces, so that by means of the different adjustments described varying degrees of gripping power may be obtained as occasion may require.

It will thus be seen that my invention provides a traction wheel which, while simple of construction, provides gripping means which may be controlled as desired so as to be entirely thrown out of action, to be disposed for a yielding action and partially gripping effect, or to be disposed as for a full gripping effect, the advantages of which will be evident. The guide passages of the couplings 4 preferably have beveled surfaces which free the ends 8 of the grippers from accumulated mud or dirt when the grippers are slid inwardly, thus preventing the guide passages from becoming choked.

I claim:—

1. A traction wheel comprising a hub, rigid spokes and a rim, said rim being provided with guide passages, radially movable gripping spokes slidable at their outer ends through said guide passages and at their inner ends within the hub, springs for holding said gripping spokes projected, projections upon the gripping spokes, links having elongated slots at their outer ends receiving the projections upon the gripping spokes, and forming slip-joint connections between the links and spokes, means pivotally connecting the inner ends of the spokes eccentric to the wheel hub, and means for transmitting adjusting motions to said connecting means.

2. A traction wheel comprising a hub, rigid spokes and a rim, said rim being provided with guide passages, radially movable gripping spokes slidable at their outer ends through said guide passages and at their inner ends within the hub, springs for holding said gripping spokes projected, projections upon the gripping spokes, a rotary collar upon the hub, eccentric links pivotally connected at their inner ends with said collar and having elongated slots at their opposite ends receiving the projections upon the gripping spokes, and forming slip-joint connections between the links and spokes, means for rotating said collar upon the wheel hub for adjusting the links inwardly and outwardly, and means for locking said adjusting means in adjusted positions.

3. A traction wheel comprising a hub, rigid spokes and a rim, said rim being provided with guide passages, radially movable gripping spokes slidable at their outer ends through said guide passages and at their inner ends within the hub, springs for holding said gripping spokes projected, projections upon the gripping spokes, a rotary collar upon the hub, and eccentric links pivotally connected at their inner ends with said collar and having elongated slots at their opposite ends receiving the projections upon the gripping spokes, and forming slip-joint connections between the links and spokes, substantially as and for the purpose described.

In testimony whereof I affix my signature in presence of two witnesses.

JAMES WESLEY BRUCE.

Witnesses:
MAGGIE McVAY,
M. W. McVAY.

Copies of this patent may be obtained for five cents each, by addressing the "Commissioner of Patents, Washington, D. C."